May 11, 1943.  C. M. CONRADSON  2,318,838
HYDROSTATIC MANDREL
Filed March 22, 1940
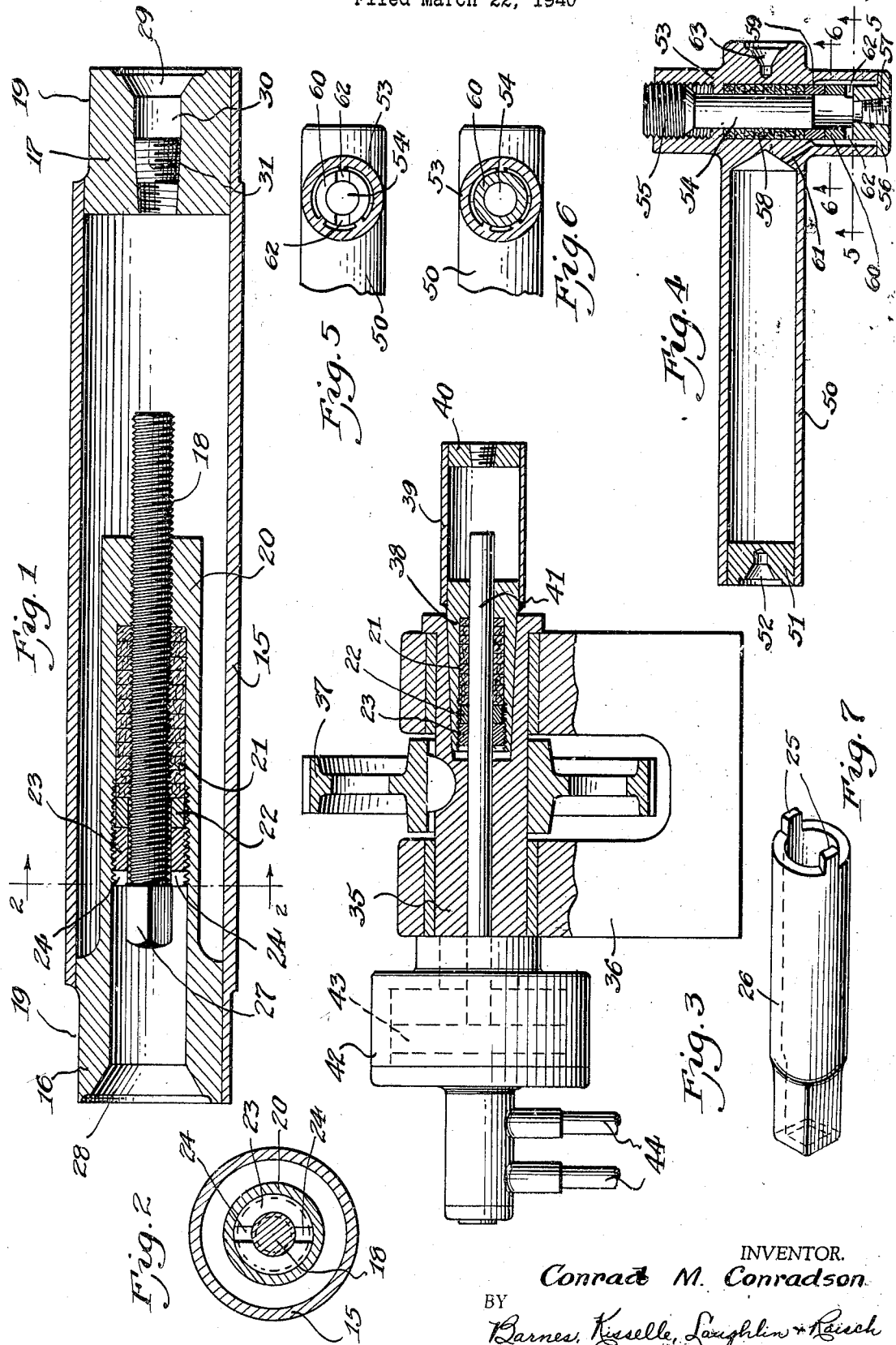
INVENTOR.
Conrad M. Conradson
BY
Barnes, Kisselle, Laughlin & Raisch
ATTORNEYS Patented May 11, 1943

2,318,838

UNITED STATES PATENT OFFICE 2,318,838

HYDROSTATIC MANDREL

Conrad M. Conradson, Detroit, Mich.; Frederick R. Walter, administrator of said Conrad M. Conradson, deceased, assignor, by mesne assignments, to Oscar Christianson, Madison, Wis., as trustee Application March 22, 1940, Serial No. 325,387

7 Claims. (Cl. 82—44)

This invention relates to a hydrostatic mandrel and particularly to that type of mandrel which is called an expanding mandrel.

Present types of mandrels are, for the most part, formed with a very slight taper of .0005 of an inch to the longitudinal inch. This permits the forcing of the work on the mandrel but results in either a considerable distortion of the work or a loose fit on the outer end which causes sloppiness and cocking of the work.

It is an object of the present invention to provide a mandrel which avoids these difficulties and which insures a perfect fit between the work and the mandrel without distortion.

A further object of the invention has to do with details of the construction of the hydrostatic mandrel wherein suitable seals may be provided to withstand the high pressures of from two to five thousand pounds per square inch and also suitable means is provided to avoid the possibility of air being trapped within the mandrel.

Other objects and features of the invention, having to do with details of construction and operation as, for example, the novel adjustment means and the pressure sealing means, will be brought out in the following description and claims.

In the drawing:

Fig. 1 is a longitudinal section through a preferred embodiment of the invention showing simply the mandrel.

Fig. 2 is a section on the lines 2—2 of Fig. 1.

Fig. 3 is a modified type of mandrel illustrating a pressure means for operating the same.

Fig. 4 is a further modification in which the pressure forming means lies transversely of the mandrel and in which the internal pressure serves to seal the pressure forming means.

Figs. 5 and 6 are sections on the lines 5—5 and 6—6 of Fig. 4.

Fig. 7 is a partial view of a tool which is used in combination with the device shown in Figs. 1 and 3 for tightening the packing.

Referring to the drawing in Fig. 1 an expanding mandrel is shown including an outer shell 15, end plugs 16 and 17, and a pressure forming plunger 18. The outer shell 15 is a relatively thin walled cylinder formed of a good grade of steel and the end plugs 16 and 17 are forge welded into the end of the cylinder. One side of each of the ends is formed with a flat portion 19 to permit the customary drive. The end plug 16 has an axial extension 20 which, in turn, is provided with an axial recess. The axial recess is threaded at its inner end to receive the threaded plunger 18 and is enlarged at its outer end to provide for packing 21 and also to provide for the insertion of adjusting tools.

The packing 21, which consists of a plurality of discs of packing material, is backed by a gland 22 which, in turn, is controlled by a threaded insert 23, the insert 23 being threaded in the axial recess of plug 16, the outer surface of the insert 23 being provided with slots 24 adapted to receive the projections 25 on a tool 26, shown in Fig. 7. This tool is a spanner wrench which permits the tightening of insert 23 to force the packing material 21 into close sealing contact with the plunger 18. The end of the plunger 18 is provided with the head 27, which is to be received in another tool (not shown) so that the plunger 18 may be threaded in and out of the cylinder 15. Plug 16 is also provided with a tapered recess 28 to facilitate centering of the mandrel.

Plug 17 also has a tapered recess 29 leading to an axial opening 30 which is closed by an Allen plug 31.

In the use of this device the plug 31 is removed and the plunger 18 is screwed outwardly from the position shown. The cylinder 15 is then filled with the substantially incompressible liquid such as oil or a heavy grease and the plunger 18 then turned inwardly until the grease starts filling the hole 30. The Allen plug may then be inserted and the cylinder will be free of air pockets. During the inserting of the Allen plug, it may be necessary to retract the plunger 18 to some extent to insure a tight fit of the plug. The device after being filled is then ready for use as a mandrel. It is preferably machined so that there will be at least .0005 of an inch clearance between the outside of the mandrel and the inside of the work. After the work is slipped on the mandrel, the plunger 21 may be screwed into the cylinder to increase the internal pressure and expand the walls, thereby assuring a firm grip of the work.

In Fig. 3 is shown the application of the mandrel to a rotating spindle. The spindle 35 is suitably mounted in a frame 36 and driven by a wheel or gear 37. The mandrel is formed with a tapered end plug 38 extending from a cylinder 39. The outer end of the cylinder is closed by a plug 40, the tapered plug is provided with a packing arrangement similar to that described in connection with Fig. 1. Instead of a threaded plunger, a smooth plunger 41 is used. Various means of actuating this plunger can be used and in the embodiment shown, the cylinder 42, in cooperation with a piston 43, serves to actuate the plunger. Tubes 44 can be used to furnish pressure to the piston 43.

Another embodiment of the invention is shown in Figs. 4, 5 and 6. In Fig. 4 an expanding mandrel cylinder is shown at 50 with one end plugged by a member 51 which is provided with the centering recess 52. At the other end of the cylinder 50 is a head 53 extending transversely of the cylinder. In an axial recess in this head is a plunger 54 threaded at 55 so that it may be moved in and out of the axial recess. At the other end of the head, a plug 56 closes the axial recess and is provided with an insert 57 which may be used to fill the device with the incompressible fluid. Surrounding the plunger 54, packing material 58 is provided, and this material is retained in position by rings 59 and 60 slidably arranged within the recess. The axial recess of head 53 is slightly enlarged at the lower end and this enlargement is connected to the cylinder by a passage 61. Ring 60 is slotted at 62 to connect the various recesses. After the cylinder 50 and the recess of head 53 are filled with liquid through insert 57, when pressure is applied thereto by turning the plunger 54 inward, it will be exerted on the walls of cylinder 50 to cause expansion thereof. This pressure will also be exerted upwardly against the rings 59 and 60 as viewed in Fig. 4, to compress the packing material 58 around the plunger 54 whereby sealing the same. It will be seen that the greater the internal pressure, the greater will be the sealing force on the packing material. The recess 63 is provided in the head 53 coaxial with the cylinder 50 for centering the head end.

I claim:

1. An expanding mandrel comprising a relatively thin walled cylinder, means closing one end thereof and forming a center support therefor, a plug for the other end of said cylinder, means in said plug for increasing pressure within said cylinder when the cylinder is completely filled with an incompressible fluid, said means comprising a plunger received by said plug and threaded therein, a body of packing material surrounding said plunger, and means within said plug to create pressure against said packing material to force the same around said plunger.

2. An expanding mandrel comprising a relatively thin walled cylinder, means at one end for plugging the same, a closing means for the other end of said cylinder, and a pressure forming means mounted in said last named end comprising a threaded piston, means connecting one end of said piston with a body of incompressible fluid within said cylinder, a body of packing material surrounding said piston, a retaining ring surrounding said piston bearing at one end on said material, the other end being exposed to the fluid within said cylinder whereby pressure from said fluid will be exerted against said retaining ring to increase the pressure exerted by said packing material around said piston to seal the same.

3. An expanding mandrel comprising a relatively thin walled cylinder, means at one end for plugging the same, a closing means for the other end of said cylinder, and a pressure forming means mounted in said last named end comprising a threaded piston located transversely of said cylinder, means connecting one end of said piston with a body of incompressible fluid within said cylinder, a body of packing material surrounding said piston, a retaining ring surrounding said piston bearing at one end on said material, the other end being exposed to the fluid within said cylinder whereby pressure from said fluid will be exerted against said retaining ring to increase the pressure exerted by said packing material around said piston to seal the same.

4. In combination, an expanding mandrel comprising a thin walled cylinder, a plug at each end to retain liquid therein, one of said plugs having a plunger opening therein, and a machine tool attachment comprising means for mounting said mandrel, a plunger adapted to be received in said opening, a piston on said plunger, a cylinder in which said piston is located, and means for furnishing liquid under pressure to said piston to force said plunger into said mandrel cylinder.

5. An expanding mandrel comprising a relatively thin walled cylinder, means at one end for plugging the same, and a transverse pressure forming head at the other end comprising a pressure cylinder, one end of which is connected to said thin walled cylinder, a plunger entering said pressure cylinder having a portion threaded in said head, and means sealing the plunger in said cylinder whereby pressure may be built up within said cylinders to cause expansion of the walls of said thin walled cylinder.

6. An expanding mandrel comprising a relatively thin walled cylinder, means closing one end thereof and forming a center support therefor, sealing means for the other end of said cylinder, said sealing means incorporating an adjustable rod adapted to project into and directly contact an incompressible fluid when said mandrel is completely filled with said incompressible fluid.

7. An expanding mandrel comprising a relatively thin walled cylinder, a first means closing one end thereof, a second means closing the other end thereof, said second means having a cylindrical opening therethrough, said opening being operatively connected with the interior of said cylinder, an adjustable rod in said opening, packing material sealing said rod in said second means, means to fill said mandrel with an incompressible fluid whereby said adjustable rod has direct contact with said fluid and said rod may be adjusted to increase the pressure on said fluid and expand the thin walls of said cylinder.

CONRAD M. CONRADSON.